Nov. 3, 1964

A. J. PETZINGER 3,155,903

POLYPHASE MEASURING DEVICE USING A SINGLE EDDY CURRENT
TYPE MEASURING UNIT AND A THREE-WINDING MUTUAL REACTOR

Filed Oct. 17, 1960

United States Patent Office 3,155,903
Patented Nov. 3, 1964

3,155,903
POLYPHASE MEASURING DEVICE USING A SINGLE EDDY CURRENT TYPE MEASURING UNIT AND A THREE-WINDING MUTUAL REACTOR
Ambrose J. Petzinger, Glen Rock, N.J., assignor to Westinghouse Electric Corporation, East Pittsburgh, Pa., a corporation of Pennsylvania
Filed Oct. 17, 1960, Ser. No. 63,108
17 Claims. (Cl. 324—107)

This invention relates to measuring devices responsive to polyphase quantities and it has particular relation to devices for measuring a function of the product of voltage and current in a polyphase circuit.

Proposals have been made in the prior art to simplify the equipment required to respond to a function of the volt-amperes of a polyphase electrical system. One approach is based on the measurement of the positive phase sequence components of polyphase power as shown in the Petzinger et al. Patent 2,513,891.

In accordance with the invention, a single element responsive to a function of the volt-amperes of a polyphase electrical system has an electromagnet which receives three energizing components phase shifted to register correctly the desired quantity. In a preferred embodiment of the invention, at least part of the energization is applied through a three-winding mutual reactor which is energized by two phase currents derived from an alternating current polyphase system in which the quantity-to-be-measured is being transmitted. The output of the three-winding mutual reactor is supplied to the electromagnet.

The invention further contemplates that an increase in temperature acts to phase shift current supplied to the electromagnet in a leading direction. By proper design, the amount of Class I temperature compensation, Class II temperature compensation, damping and quadrature lagging of voltage magnetic flux may be reduced.

It is therefore an object of the invention to energize a device responsive to a function of the volt amperes of a polyphase electrical system by three current components representing phase currents of the polyphase electrical system but properly phase shifted to permit utilization of a common electromagnet.

It is another object of the invention to provide a three-winding mutual reactor for supplying at least part of the energization of the device of the preceding paragraph.

It is also an object of the invention to provide a device responsive to a function of the volt-amperes of a polyphase electrical system wherein alternating currents supplied to an electromagnet are shifted in a leading direction in response to increase in temperature of the device.

It is a further object of the invention to provide an improved mutual reactor having separate adjustments for mutual reactance and self-reactance.

Other objects of the invention will be apparent from the following description taken in conjunction with the accompanying drawings, in which.

Figure 1:
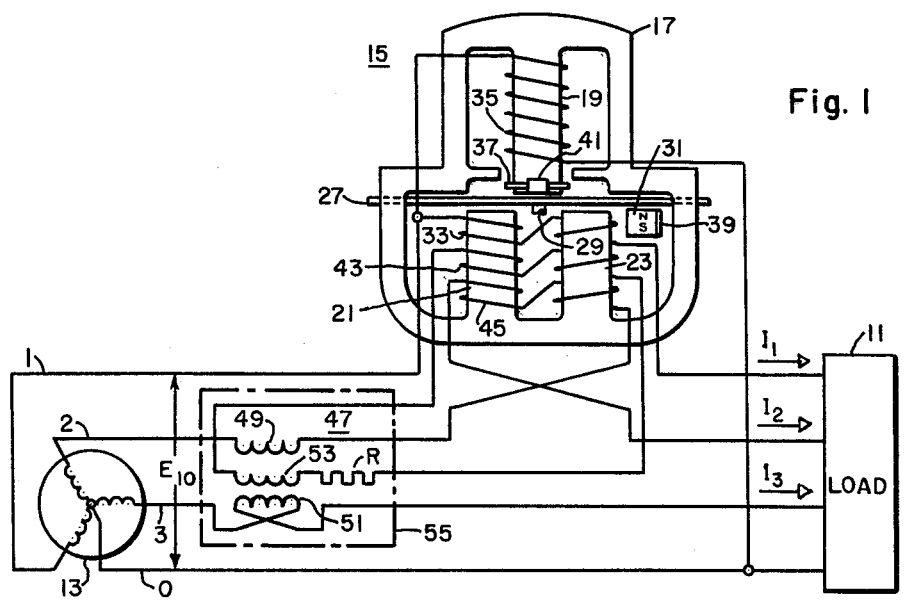
FIGURE 1 is a schematic view with parts shown in elevation and parts broken away of an electrical system embodying the invention.

Referring to the drawings, FIGURE 1 shows three phase coductors 1, 2, and 3 and a neutral conductor 0, which are employed in conducting polyphase energy to a load 11 from a suitable source represented by a generator 13. It will be assumed that the generator 13 has star-connected windings designed for generating three-phase energy at a frequency of 60 cycles per second. This generator applies phase currents $I_1$, $I_2$ and $I_3$, respectively over the phase conductors 1, 2 and 3.

In order to measure a function of the electrical energy supplied by the generator 13 to the load 11, a measuring device 15 is provided. This measuring device includes a magnetic structure 17 which may be constructed of a plurality of laminations of soft magnetic material such as silicon iron. The magnetic structure has a voltage pole 19 spaced from two current poles 21 and 23 to define an air gap 25. An electroconductive armature which may be in the form of an electroconductive disk 27 has a portion disposed in the air gap. The armature is mounted on a shaft 29 for rotation about a vertical axis. The armature rotates through the field of a permanent magnet 31 for the purpose of damping rotation of the armature.

A current winding 33 has a coil disposed on each of the current poles 21 and 23. The coils are connected in series and are so related that when the coil on the pole 21 produces a magnetomotive force directed vertically upward, the coil on the pole 23 produces a magnetomotive force directed vertically downward. The winding 33 is connected in the phase conductor 1 for energization by the current $I_1$. A voltage winding 35 is located on the voltage pole 19 and is energized by a voltage derived from the polyphase system.

The response of the measuring device 15 depends on the energizing quantities. Thus if the voltage applied to the voltage winding 35 is in quadrature with the current $I_1$ when the polyphase system is operating at unity power factor, the energizations of the winding 33 and 35 produce a response of the measuring device which is proportional to reactive volt-amperes or vars in one phase of the polyphase system. For present purposes, it will be assumed that the voltage $E_{10}$ which appears between the conductors 1 and 0 is applied across the voltage windings 35. This voltage is in phase with the current $I_1$ in the phase conductor 1 when the polyphase system is operating at unity power factor. Consequently, the measuring device 15 responds to the energizations of the windings 33 and 35 in accordance with the real power in one phase of the associated polyphase system.

The components of the measuring device 15 in FIGURE 1 which thus far have been specifically mentioned are similar to those found in the conventional watthour meter. A conventional quadrature loop 37 surrounds the tip of the voltage pole 19 in order to establish proper phase relationship between voltage and current magnetic fluxes. Class I temperature compensation for the measuring device may be provided in a conventional manner as by a shunt 39 across the poles of the permanent magnet 31. As well understood in the art, the shunt is constructed of a material having a negative temperature coefficient of permeability and is proportioned to provide adequate Class I temperature compensation. Class II temperature compensation may be provided in a conventional manner as by linking the quadrature loop 37 with a magnetic loop 41 having a negative temperature coefficient of permeability.

Rotations of the armature 27 may be counted in a conventional manner by a meter register (not shown) in order to indicate the energy supplied to the load 11.

In order to measure the polyphase energy supplied to the load 11, two additional windings 43 and 45 are associated with the current poles 21 and 23. These windings are similar to the winding 33. The winding 45 is connected for energization in accordance with the current $I_2$ flowing in the phase conductor 2. However, at unity power factor of the polyphase system, the current $I_2$ lags the voltage $E_{10}$ applied to the voltage winding 35 by 120° as shown in the vector diagram of FIGURE 2. To assure proper operation of the measuring device, the connections of the winding 45 to the phase conductor 2 are reversed in order to produce a magnetomotive force in the current poles 21 and 23, which is proportional to $-I_2$.

In addition, a second energization is derived from the phase conductor 2 through a transformer preferably in the form of a mutual reactor 47 having two primary windings 49 and 51 and a secondary winding 53. It will be noted that the primary winding 49 is connected for energization by the current $I_2$. When the primary winding 49 is energized by the current $I_2$, a voltage $jwMI_2$ appears across the secondary winding 53. In this voltage expression, $j$ is the conventional vector operator which rotates a vector through an angle of 90°, $w$ is the frequency of the polyphase system multiplied by $2\pi$, and $M$ is the mutual inductance appearing between the primary and secondary windings of the mutual reactor. This voltage is applied to a closed loop which includes the secondary winding 53, a resistor R and the current winding 43. The total resistance and reactance of this loop are selected to provide an impedance $$Z = \frac{\sqrt{3}}{2} wM + jw\frac{M}{2}$$

Consequently, the current flowing in the meter current winding 43 is $$\frac{jwMI_2}{Z}$$

which equals $I_2 \angle 60°$.

It will be recalled that the winding 45 produces a magnetomotive force represented by the current $-I_2$ and that the winding 43 produces a magnetomotive force represented by the current $I_2 \angle 60°$. The resultant of these two magnetomotive forces then is represented by the expression $-I_2 + I_2 \angle 60° = I_2 \angle 120°$.

Figure 2:
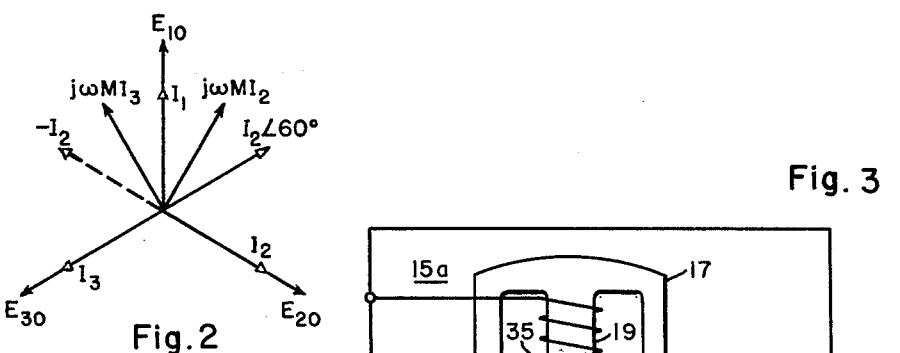
FIGURE 2 is a vector diagram showing voltage and current relationship in the system of FIGURE 1.

For a balanced unity power factor load, it will be noted by reference to FIGURE 2 that rotation of the current vector $I_2$ in a counterclockwise direction through an angle of 120° brings the current into phase with the voltage $E_{10}$. The measuring device 15 now measures correctly the energy supplied to the load over the phase conductor 2.

For optimum accuracy, the voltages $E_{10}$, $E_{20}$ and $E_{30}$ which are the three phase voltages produced by the generator 13 should always be equal to each other and should be balanced as shown in FIGURE 2. Furthermore, the system should operate at a constant frequency. These conditions are adequately satisfied by modern distribution systems.

The winding 43 also derives energy from the phase conductor 3. By inspection of FIGURE 1, it will be noted that the current $I_3$ is directed in a reverse direction through the primary winding 51 to induce a voltage $-jwMI_3$ in the secondary winding 53. This voltage directs a current $I_3 \angle -120°$ through the impedance Z of the loop circuit associated with the secondary winding 53. Consequently, the current winding 43 also is energized by a current represented by the expression $I_3 \angle -120°$. By inspection of FIGURE 2, it will be noted that if the current $I_3$ is rotated 120° in a clockwise direction, it is brought into phase with the voltage $E_{10}$. Consequently, the measuring device 15 measures correctly energy applied to the load over the phase conductor 3.

The network 55 comprising the mutual reactor 47 and the resistor R may be incorporated in the case which contains the measuring device 15 or it may be supplied in a separate case. If desired, the measuring device 15 may be installed initially for single phase operation, in which case the windings 43 and 45 would remain disconnected. At a later date, the network 55 can be added to convert the meter into a polyphase meter. It should be noted that if one of the phase conductors, such as the conductor 1, is omitted, the system is converted into one referred to as a network system. Under such circumstances, the measuring device 15 measures correctly energy supplied over the network system if the phase conductor 1 is available for supplying the voltage $E_{10}$ to the voltage winding 35 or if a comparable voltage is supplied from the other conductors. Such a comparable voltage could be obtained by suitably adding the voltages $E_{30}$ and $E_{20}$, or from one of these available voltages through a suitable phase shifter. For such operation the current winding 33 would not be energized and could be omitted.

By inspection of FIGURE 1, it will be noted that the loop circuit associated with the secondary winding 53 of the mutual reactor is completely isolated. Consequently, the winding 43 may be omitted and the output of the secondary winding 53 may be supplied to one of the other windings of the measuring device 15. This is illustrated in FIGURE 3 where again the measuring device 15a is similar to the measuring device 15 except for the omission of the winding 43 of FIGURE 1. The measuring device 15a of FIGURE 3 consequently is similar to the conventional three-wire watthour meter having two current windings.

Figure 3:
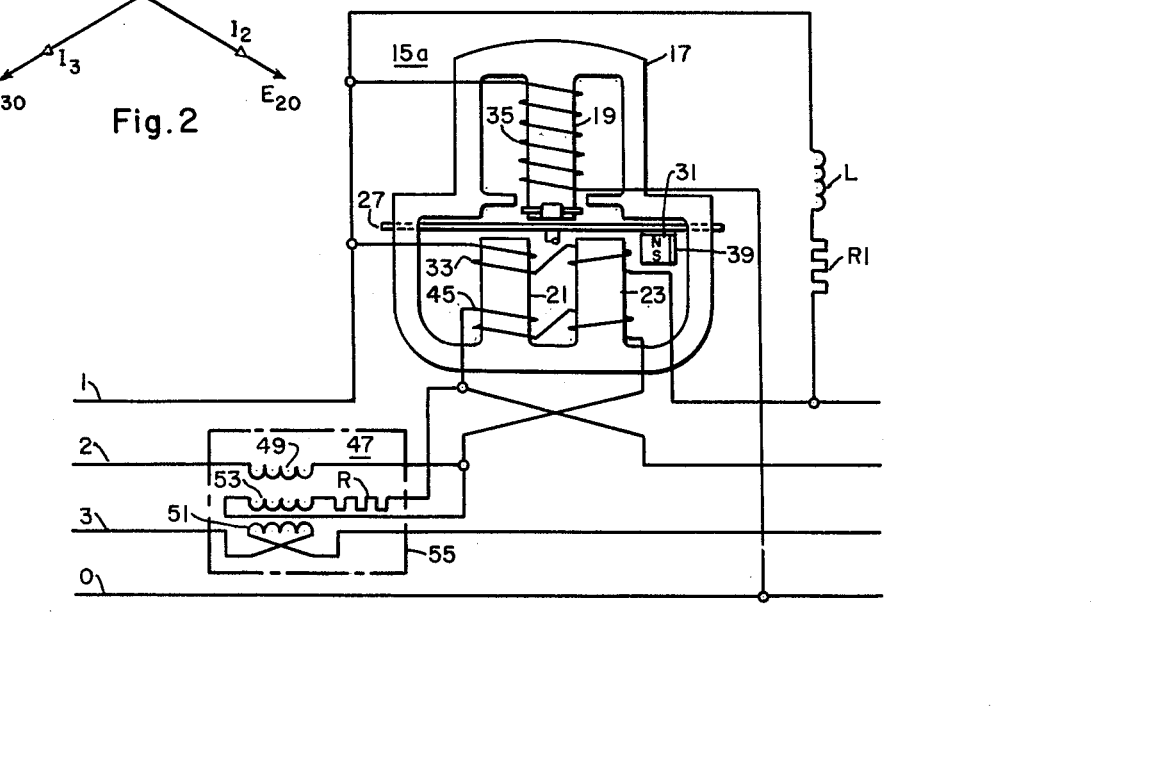
FIGURES 3, 4 and 5 are diagrammatic views with parts shown in elevation and parts broken away of electrical systems showing modified forms of the invention.

The current windings 33 and 45 of FIGURE 3 are energized in the same manner shown in FIGURE 1. In addition, the current winding 45 is connected in a loop circuit with the resistor R and the secondary winding 53 of the mutual reactor. Consequently, the current winding 45 additionally receives an energization similar to that applied to the current winding 43 of FIGURE 1. Thus the measuring device 15a of FIGURE 3 accurately measures the three-phase energy applied to a load but it has a watt loss lower than that of the measuring device 15 of FIGURE 1 for a given amount of copper.

In FIGURE 3, the current winding 45 now is shunted by a circuit containing the secondary winding 53 and the resistor R. The current winding 33 is similarly shunted through a circuit containing an inductance L and a resistor R1. This shunt circuit is designed to provide an impedance equal to that of the shunt circuit across the current winding 45. The effect of the shunt circuit is to reduce the effective ampere turns of the current windings for a given meter rating. Thus for a 15 ampere rating, the ampere turns per pole may be reduced from a 45 ampere turn for the measuring device of FIGURE 1 to, say, 30 ampere turns for the device of FIGURE 3. This improves the overload performance of the measuring device.

Figure 4:
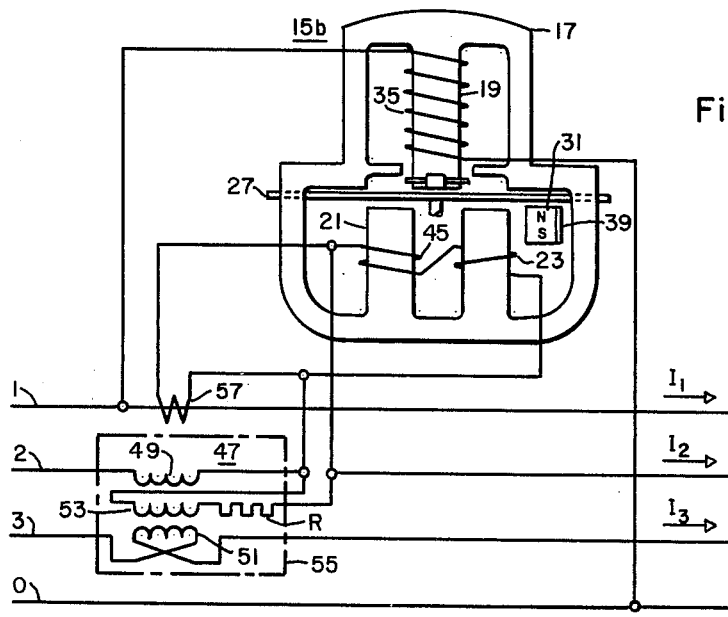

In FIGURE 4, a measuring device 15b is illustrated which is similar to the measuring device 15a of FIGURE 3, except for the omission of the current winding 33. Thus the measuring device 15b is similar to a conventional two-wire watthour meter.

The current winding 45 of FIGURE 4 is energized in the same manner shown in FIGURE 3. In addition, the current winding 45 is connected across the secondary winding of a current transformer 57 which has its primary winding connected for energization by the current $I_1$ flowing in the phase conductor 1. For a given current $I_1$, the current transformer 57 is designed to supply to the winding 45 the same number of ampere turns which would have been supplied to the current winding 33 of FIGURE 3. Thus the measuring device 15b correctly measures energy supplied to a load by the associated polyphase system.

Figure 5:
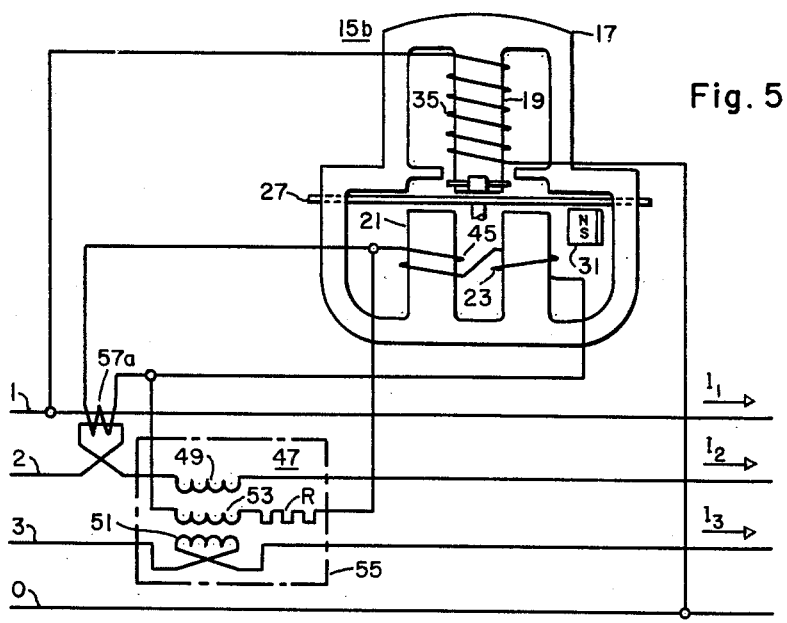

In FIGURE 5, the measuring device 15b has its current winding 45 energized from the secondary winding 53 of the mutual reactor in the same manner shown in FIGURE 4. However, the two-winding current transformer 57 of FIGURE 4 is replaced in FIGURE 5 by a three-winding current transformer 57a having two primary windings. The secondary winding of the current transformer 57a is connected across the current winding 45. One of the primary windings of the current transformer 57a is energized by the current $I_1$ flowing in the phase conductor 1 and the current transformer 57a therefore supplies a component of energy to the current winding 45 similar to that supplied by the current transformer 57 in FIGURE 4. The second primary winding of the current transformer 57a is connected for energization in accordance with the current $I_2$ flowing in the conductor 2. The connections of the primary winding are shown reversed in FIGURE 5 to indicate that it supplies a current energization for the measuring device 15b corresponding to $-I_2$. With the connections illustrated in FIGURE 5, the measuring device 15b correctly measures polyphase energy supplied to a load over the associated polyphase system.

In multielement polyphase meters, it is the practice to provide adjustments by which the torques developed by the elements may be balanced for equal energizations of the elements. In the system herein discussed, balancing can be effected by adjusting the torques derived from the phase conductors 1 and 3 alone.

Thus, in FIGURE 5 the output of the current transformer is applied to the current winding 45 and to the secondary winding of the mutual reactor in parallel. A phase shift or a magnitude change in this area would affect current derived from the phase conductors 1 and 2 in the same manner.

The voltage across the secondary winding of the mutual reactor directs a current through the secondary winding 53, the resistor R and the current winding 45 in series. A phase shift or a magnitude change in this area would affect current derived from the phase conductors 2 and 3 in a similar manner.

To facilitate adjustments of the balance of the measuring device provisions are made for adjusting the magnitude and phase of the current supplied by the secondary winding 53 of the mutual reactor. Although the phase of the current may be adjusted by employing an adjustable resistor R, preferably it is obtained by adjusting independently the self-reactance of the secondary winding 53. The magnitude adjustment may be obtained by providing an adjustment of the mutual reactance of the mutual reactor.

Figure 6:
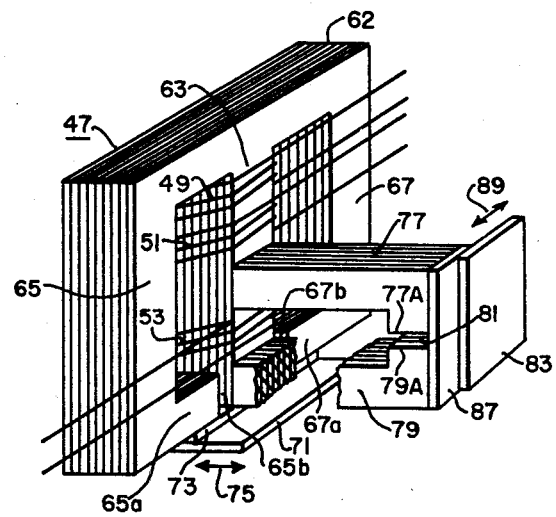
FIGURE 6 is a view in perspective of a mutual reactor which may be employed in the embodiment of FIGURES 1, 3, 4 and 5.

FIGURE 6 shows a suitable construction for the mutual reactor 47. The mutual reactor includes a magnetic structure 62 constructed of laminations of soft magnetic material, such as soft iron and having a central pole piece 63 and two outer legs 65 and 67 which have inwardly turned feet 65a and 67a, respectively, to provide air gaps 65b and 67b between the feet and the free end of the central pole piece 63. The three windings 49, 51 and 53 are wound on the central pole piece 63. The mutual reactance of the mutual reactor is adjusted by means of a soft magnetic keeper 71 which is spaced from the magnetic structure 61 by means of a non-magnetic spacer 73. The keeper 71 is adjustable in the direction of the arrows 75 to vary the extent of bridging of the air gaps 65b and 67b by the keeper 71.

The self-reactance of the winding 53 is adjusted by establishing a separate adjustable magnetic circuit for this winding. To this end, two soft magnetic legs 77 and 79 project from the central pole piece 63 on opposite sides of the secondary winding 53 and have feet 77A and 79A which are turned towards each other to establish an air gap 81. This air gap is bridged to an adjustable extent by an adjustable soft magnetic keeper 83 which is spaced from the feet 77a and 79a by a non-magnetic spacer 87. Thus, by adjusting the keeper 83 in the direction of the arrows 89, the self-reactance of the secondary winding 53 may be adjusted.

Figure 7:
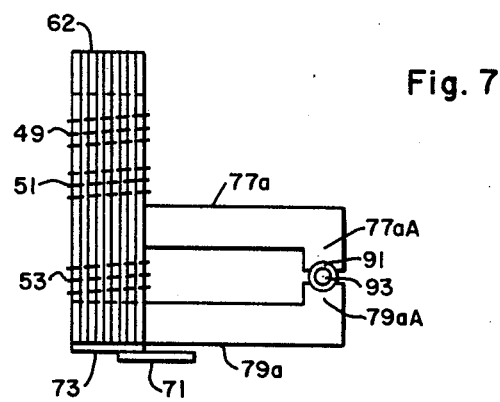
FIGURE 7 is a view in side elevation showing a modified form of a mutual reactor which may be employed in place of that shown in FIGURE 6.

In FIGURE 7, a mutual reactor is illustrated which is similar to that of FIGURE 6 except for the replacement of the legs 77 and 79 of FIGURE 6, by two legs 77a and 79a having feet 77aA and 79aA. The adjacent surfaces of the feet are arcuately shaped to receive a tubular non-magnetic spacing member 91. A soft magnetic rod or keeper 93 is located within the tubular spacing member 91 and is adjustable in an axial direction for the purpose of adjusting the self-reactance of the winding 53.

It is the practice to construct the windings of a material such as copper which has a substantial positive temperature coefficient of resistance. The resultant temperature coefficient of resistance of the loop energized from the secondary winding 53 may be made substantially lower, say, approximately one-third that of copper. This may be effected by constructing substantial parts of the resistor R of a material such as manganin having a low temperature coefficient of resistance. An increase in temperature then would tend to shift the phase of the current derived from the secondary winding slightly in the leading direction. Such a shift would decrease the torque derived from the current $I_3$ at unity power factor and would increase the torque at, say, 50% power factor.

With respect to current derived from the phase conductor 1, as the temperature rises the resistance of the current winding 45 increases at a rate faster than that of the circuit shunting the current winding. Also the current winding 45 derived from the phase current $I_1$ shifts slightly in phase towards the leading direction. Thus the currents derived from the phase currents $I_3$ and $I_1$ behave very similarly. For the reasons previously presented, the current derived from the phase current $I_2$ also would follow similar variations.

As the temperature varies, the torque developed by the electromagnet and the damping introduced by the permanent magnet both vary in the same direction. Consequently, the amount of temperature compensation required by the permanent magnet may be substantially reduced or possibly eliminated by this selection of temperature coefficients of resistance.

It will be recalled that as the temperature rises, the current supplied to the current winding 45 tends to advance slightly in phase in the leading direction. This tends to compensate for Class II temperature errors introduced by the voltage circuit of a measuring device.

When the current transformer is employed in association with the phase conductor 1, the current derived from the secondary winding of the transformer tends to lead the phase current $I_1$ slightly. Inasmuch as the current derived from the phase conductor 3 is adjusted to match that derived from the phase conductor 1 and inasmuch as the current derived from the phase conductor 2 is similarly effective, the result is to reduce the amount of lagging required in the potential circuit. This reduces the size required for the quadrature loop 37, and would facilitate the combining of the quadrature loop with the conventional light-load adjuster in a unitary assembly.

Although the invention has been described with reference to certain specific embodiments thereof, numerous modifications falling within the spirit and scope of the invention are possible.

I claim as my invention:

1. In a measuring device for measuring a function of the product of voltage and current in a three-phase alternating current system carrying phase currents $I_1$, $I_2$ and $I_3$ which in a vector system are represented by vectors rotating counterclockwise and for a balanced load are angularly spaced 120° from each other, a measuring unit having a voltage winding and first, second and third current windings, and translating means responsive to alternating energizations of the voltage winding and any of the current windings in accordance with a function of the product of such energizations, means connecting the first, second and third current windings for energization respectively to operate the translating means in accordance with $I_1$, $I_2 \angle 120°$ and $I_3 \angle -120°$ in proportions such that for balanced load on the system $I_1$, $I_2 \angle 120°$ and $I_3 \angle -120°$ are coincident in phase and magnitude, the currents being referred to a vector system such that an angle appended to a vector having a first position operates to rotate the vector counterclockwise for a positive angle and clockwise for a negative angle from such first position for an angular distance represented by said angle.

2. In a measuring device for measuring a function of the product of voltage and current in a three-phase alternating current system carrying phase currents $I_1$, $I_2$ and $I_3$ which in a vector system are represented by vectors rotating counterclockwise and for a balanced load are angularly spaced 120° from each other, a measuring unit having a voltage winding and first, second and third current windings, and translating means responsive to alternating energizations of the voltage winding and any of the current windings in accordance with a function of the product of such energizations, a three-winding reactor having first and second primary winding and a secondary winding mutually coupled to the primary windings, said secondary winding being coupled with the second current winding in a loop circuit having an impedance $$Z = \frac{\sqrt{3}}{2} wM + j\frac{wM}{2}$$

where $w$=frequency multiplied by $2\pi$, M represents the mutual reactance between the secondary and each primary winding, and $j$ represents the conventional operator and providing a current flowing through the second current winding proportional to $$j\frac{wMI_2}{Z}$$

which is equivalent to $I_2 \angle 60°$, said third current winding being coupled for energization by the current $I_2$ to provide with said first-named energization of the second winding energization of the translating means by the second and third current windings in accordance with $$-I_2 + I_2 \angle 60°$$

which is equivalent to $I_2 \angle 120°$, and means connecting the second primary winding for energization in accordance with $I_3$ to provide an energization of the translating means through the second current winding in accordance with $$-j\frac{wMI_3}{Z}$$

which is equivalent to $I_3 \angle -120°$, the currents being referred to a vector system such that an angle appended to a vector having a first position operates to rotate the vector counterclockwise for a positive angle and clockwise for a negative angle from such first position for an angular distance represented by said angle.

3. In a measuring device for measuring a function of the product of voltage and current in a three-phase alternating current system carrying phase currents $I_1$, $I_2$ and $I_3$ which in a vector system are represented by vectors rotating counterclockwise and for a balanced load are angularly spaced 120° from each other, a measuring unit having a voltage winding and first, second and third current windings, and translating means responsive to alternating energizations of the voltage winding and any of the current windings in accordance with a function of the product of such energizations, means coupling the third winding for energization in accordance with $I_2$, means coupling the second winding for energization in accordance with a quantity having a magnitude proportional to $I_2$ but displaced by an angle from $I_2$, the magnitudes and angles of said energizations being proportioned to produce a resultant magnetomotive force proportional to $I_2 \angle 120°$, and means coupling the second winding for energization by a quantity corresponding to $I_3 \angle -120°$, the currents being referred to a vector system such that an angle appended to a vector having a first position operates to rotate the vector counterclockwise for a positive angle and clockwise for a negative angle from such first position for an angular distance represented by said angle.

4. In a measuring device for measuring a function of the product of voltage and current in a three-phase alternating-current system carrying phase currents $I_1$, $I_2$ and $I_3$, a measuring unit having translating means, voltage winding means and current winding means effective when energized from a three-phase alternating current system for operating the translating means in accordance with a function of the product of the energizations of the winding means, said current winding means comprising a current winding, a plurality of terminals including first, second and third line terminals, first, second and third load terminals, means coupling the current winding means for energization in accordance with alternating current $I_2$ passing between the second terminals, and means coupling the current winding for energization by an alternating quantity corresponding to the alternating current $I_2$ but displaced from such alternating current by an angle of 60°.

5. In a measuring device for measuring a function of the product of voltage and current in a three-phase alternating-current system carrying phase currents $I_1$, $I_2$ and $I_3$ which in a vector system are represented by vectors rotating counterclockwise and for a balanced load are angularly spaced 120° from each other, a measuring unit having translating means, voltage winding means and current winding means effective when energized by a three-phase alternating current system for operating the translating means in accordance with a function of the product of the energizations of the winding means, said current winding means comprising a current winding, a plurality of terminals including first, second and third line terminals, first, second and third load terminals, means coupling the current winding means for energization in accordance with alternating current $I_2$ passing between the second terminals, and means coupling the current winding for energization by an alternating quantity corresponding to the alternating current $I_2$ but displaced from such alternating current by an angle of 60°, said energizations of the current winding means having magnitudes and directions proportioned to provide a resultant energization in accordance with $I_2 \angle 120°$, the currents being referred to a vector system such that an angle appended to a vector having a first position operates to rotate the vector counterclockwise for a positive angle and clockwise for a negative angle from such first position for an angular distance represented by said angle.

6. In a measuring device for measuring a function of the product of voltage and current in a three-phase alternating-current system carrying phase currents $I_1$, $I_2$ and $I_3$ which in a vector system are represented by vectors rotating counterclockwise and for a balanced load are angularly spaced 120° from each other, a measuring unit having translating means, voltage winding means and current winding means effective when energized from a three-phase alternating current system for operating the translating means in accordance with a function of the product of the energizations of the winding means, said current winding means comprising a second current winding, a plurality of terminals including first, second and third line terminals, first, second and third load terminals, means coupling the current winding means for energization in accordance with alternating current $I_2$ passing between the second terminals, and means coupling the current winding for energization by an alternating quantity corresponding to the alternating current $I_2$ but displaced from such alternating current by an angle of 60°, said energizations of the current winding means having magnitudes and directions proportioned to provide a resultant energization in accordance with $I_2 \angle 120°$, said current winding means including a first current winding connected for energization in accordance with alternating current $I_1$ flowing between the first terminals, the currents being referred to a vector system such that an angle appended to a vector having a first position operates to rotate the vector counterclockwise for a positive angle and clockwise for a negative angle from such first position for an angular distance represented by said angle.

7. In a measuring device for measuring a function of the product of voltage and current in a three-phase alternating-current system carrying phase currents $I_1$, $I_2$ and $I_3$ which in a vector system are represented by vectors rotating counterclockwise and for a balanced load are angularly spaced 120° from each other, a measuring unit having translating means, voltage winding means and current winding means effective when energized from a three-phase alternating current system for operating the translating means in accordance with a function of the product of the energizations of the winding means, said current winding means comprising a second current winding, a plurality of terminals including first, second and third line terminals, first, second and third load terminals, means coupling the current winding means for energization in accordance with alternating current $I_2$ passing between the second terminals and means coupling the current winding for energization by an alternating quantity corresponding to the alternating current $I_2$ but displaced from such alternating current by an angle of 60°, said energizations of the current winding means having magnitudes and directions proportioned to provide a resultant energization in accordance with $I_2 \angle 120°$, said current winding means including a first current winding connected for energization in accordance with alternating current $I_1$ flowing between the first terminals, and means for energizing the current winding means in accordance with $I_3 \angle -120°$ wherein $I_3$ represents current flowing between the third terminals, the currents being referred to a vector system such that an angle appended to a vector having a first position operates to rotate the vector counterclockwise for a positive angle and clockwise for a negative angle from such first position for an angular distance represented by said angle.

8. In a measuring device for measuring a function of the product of voltage and current in a three-phase alternating-current system carrying phase currents $I_1$, $I_2$ and $I_3$ which in a vector system are represented by vectors rotating counterclockwise and for a balanced load are angularly spaced 120° from each other, a measuring unit having translating means, voltage winding means and current winding means effective when energized from a three-phase alternating current system for operating the translating means in accordance with a function of the product of the energizations of the winding means, said current winding means comprising a second current winding, a plurality of terminals including first, second and third line terminals, first, second and third load terminals, means coupling the current winding means for energization in accordance with alternating current $I_2$ passing between the second terminals, and means coupling the current winding for energization by an alternating quantity corresponding to the alternating current $I_2$ but displaced from such alternating current by an angle of 60°, said energizations of the current winding means having magnitudes and directions proportioned to provide a resultant energization in accordance with $I_2 \angle 120°$, said current winding means including a first current winding connected for energization in accordance with alternating current $I_1$ flowing between the first terminals, said current winding means including a third current winding coupled for receiving said first-named energization in accordance with the current $I_2$, the currents being referred to a vector system such that an angle appended to a vector having a first position operates to rotate the vector counterclockwise for a positive angle and clockwise for a negative angle from such first position for an angular distance represented by said angle.

9. In a measuring device for measuring a function of the product of voltage and current in a three-phase alternating-current system carrying phase currents $I_1$, $I_2$ and $I_3$ which in a vector system are represented by vectors rotating counterclockwise and for a balanced load are angularly spaced 120° from each other, a measuring unit having translating means, voltage winding means and current winding means effective when energized from a three-phase alternating current system for operating the translating means in accordance with a function of the product of the energizations of the winding means, said current winding means comprising first and second current windings, first, second and third line terminals, first, second and third load terminals, means coupling the first current winding for energization in accordance with alternating current $I_1$ passing between the first terminals, means coupling the second current winding for energization in accordance with alternating current $I_2$ passing between the second terminals, a second shunt circuit for said second current winding, means mutually coupling the shunt circuit for a first energization in accordance with the alternating current $I_2$, said shunt circuit having an impedance and said energizations of the second current winding being selected to provide a resultant energization of the second current winding by said two energizations thereof equivalent to $I_2 \angle 120°$, means mutually coupling the shunt circuit for energization in accordance with alternating current $I_3$ passing between the third terminals to provide an energization $I_3 \angle -120°$ of the second current winding, and a first shunt circuit for the first current winding having substantially the impedance of the second shunt circuit, the currents being referred to a vector system such that an angle appended to a vector having a first position operates to rotate the vector counterclockwise for a positive angle and clockwise for a negative angle from such first position for an angular distance represented by said angle.

10. In a measuring device for measuring a function of the product of voltage and current in a three-phase alternating-current system carrying phase currents $I_1$, $I_2$ and $I_3$ which in a vector system are represented by vectors rotating counterclockwise and for a balanced load are angularly spaced 120° from each other, a measuring unit having translating means, voltage winding means and current winding means effective when energized from a three-phase alternating current system for operating the translating means in accordance with a function of the product of the energizations of the winding means, said current winding means comprising a current winding, a plurality of terminals including first, second and third line terminals, first, second and third load terminals, means coupling the current winding for energization in accordance with the difference between alternating current $I_1$ flowing between the first terminals and alternating current $I_2$ flowing between the second terminals, means energizing the current winding from the current $I_2$ and alternating current $I_3$ flowing between the third terminals in accordance with $I_2 \angle 60°$ and $I_3 \angle -120°$, said voltage winding means comprising a voltage winding, and means for applying to the voltage winding an alternating voltage appearing between said terminals which is in phase with the current $I_1$ at unity power factor of the associated alternating-current system, the currents being referred to a vector system such that an angle appended to a vector having a first position operates to rotate the vector counterclockwise for a positive angle and clockwise for a negative angle from such first position for an angular distance represented by said angle.

11. In a measuring device for measuring a function of the product of voltage and current in a three-phase alternating-current system carrying phase currents $I_1$, $I_2$ and $I_3$ which in a vector system are represented by vectors rotating counterclockwise and for a balanced load are angularly spaced 120° from each other, a measuring unit having translating means, voltage winding means and current winding means effective when energized from a three-phase alternating current system for operating the translating means in accordance with a function of the product of the energizations of the winding means, said current winding means comprising a current winding, a plurality of terminals including first, second and third line terminals, first, second and third load terminals, a three-winding current transformer having a secondary winding connected to energize the current winding, said current transformer having two primary windings connected for energization respectively by alternating current $I_1$ flowing between the first terminals and alternating current $I_2$ flowing between the second terminals to energize the current winding in accordance with $I_1-I_2$, a three-winding mutual reactor having a secondary winding connected to energize the current winding through an impedance, said mutual reactor having a pair of primary windings connected for energization respectively by the current $I_2$ and an alternating current $I_3$ passing between the third terminals, the mutual reactor and its secondary circuit having an impedance and energizations proportioned to energize the current winding in accordance with $I_2 \angle 60°$ and $I_3 \angle -120°$, said voltage winding means comprising a voltage winding, and means for applying to the voltage winding an alternating voltage appearing between said terminals which is in phase with the current $I_1$ at unity power factor of the associated alternating current system, the currents being referred to a vector system such that an angle appended to a vector having a first position operates to rotate the vector counterclockwise for a positive angle and clockwise for a negative angle from such first position for an angular distance represented by said angle.

12. In a measuring device for measuring a function of the product of voltage and current in a three-phase alternating-current system carrying phase currents $I_1$, $I_2$, and $I_3$, a measuring unit having translating means, voltage winding means and current winding means effective when energized from a three-phase alternating current system for operating the translating means in accordance with a function of the product of the energizations of the winding means, said current winding means comprising a current winding, a plurality of terminals including first, second and third line terminals, first, second and third load terminals, means responsive to both alternating current passing between the first terminals and alternating current passing between the second terminals for energizing the current winding means, means responsive to both alternating current passing between the second terminals and alternating current passing between the third terminals for energizing the current winding means, voltage winding means responsive to an alternating voltage appearing between said terminals and cooperating with the energizations of the current winding means for operating the translating means, and balance means for balancing the effects of the current passing between the first terminals and the current passing between the third terminals on the translating means.

13. In a measuring device for measuring a function of the product of voltage and current in a three-phase alternating-current system carrying phase currents $I_1$, $I_2$ and $I_3$, a measuring unit having translating means, voltage winding means and current winding means effective when energized from a three-phase alternating current system for operating the translating means in accordance with a function of the product of the energizations of the winding means, said current winding means comprising a current winding, a plurality of terminals including first, second and third line terminals, first, second and third load terminals, means responsive to both alternating current passing between the first terminals and alternating current passing between the second terminals for energizing the current winding means, mutual reactance, means responsive to both alternating current passing between the second terminals and alternating current passing between the third terminals for energizing the current winding means, voltage winding means responsive to an alternating voltage appearing between said terminals and cooperating with the energizations of the current winding means for operating the translating means, and balance means for balancing the effects of the current passing between the first terminals and the current passing between the third terminals on the translating means, said balance means comprising first adjusting means for adjusting the self-reactance of the mutual reactance means, and second adjusting means for adjusting the mutual reactance of the mutual reactance means.

14. In a measuring device for measuring a function of the product of voltage and current in a three-phase alternating-current system carrying phase currents $I_1$, $I_2$ and $I_3$ which in a vector system are represented by vectors rotating counterclockwise and for a balanced load are angularly spaced 120° from each other, a measuring unit having translating means, voltage winding means and current winding means effective when energized from a three-phase alternating current system for operating the translating means in accordance with a function of the product of the energizations of the winding means, said current winding means comprising a current winding, a plurality of terminals including first, second and third line terminals, first, second and third load terminals, a three-winding current transformer having a secondary winding, said current transformer having two primary windings connected for energization respectively by alternating current $I_1$ flowing between the first terminals and alternating current $I_2$ flowing between the second terminals to energize the current winding in accordance with $I_1-I_2$, a three-winding mutual reactor having a secondary winding connected to energize the current winding through an impedance, said mutual reactor having a pair of primary windings connected for energization respectively by the current $I_2$ and an alternating current $I_3$ passing between the third terminals, the mutual reactor and its secondary circuit having an impedance and energizations proportioned to energize the current winding in accordance with $I_2 \angle 60°$ and $I_3 \angle -120°$, the currents being referred to a vector system such that an angle appended to a vector having a first position operates to rotate the vector counterclockwise for a positive angle and clockwise for a negative angle from such first position for an angular distance represented by said angle, said voltage winding means comprising a voltage winding, and means for applying to the voltage winding an alternating voltage appearing between said terminals which is in phase with the current $I_1$ at unity power factor of the associated alternating current system, first adjusting means for adjusting the self reactance of the secondary winding of the mutual reactor, and second adjusting means for adjusting the mutual reactance between the secondary and primary windings of the mutual reactor.

15. In a measuring device for measuring a function of the product of voltage and current in a three-phase alternating-current system carrying phase currents $I_1$, $I_2$ and $I_3$, a measuring unit having translating means, voltage winding means and current winding means effective when energized from a three-phase alternating current system for operating the translating means in accordance with a function of the product of the energizations of the winding means, coupling means for applying to the current winding means three alternating energizing component currents dependent respectively on the three phase currents $I_1$, $I_2$ and $I_3$, said component currents being in phase when said currents $I_1$, $I_2$ and $I_3$ are balanced, said coupling means having a temperature coefficient such that the component currents move in a leading direction as the temperature of the measuring device increases.

16. In a measuring device for measuring a function of the product of voltage and current in a three-phase alternating-current system carrying phase currents $I_1$, $I_2$ and $I_3$ which in a vector system are represented by vectors rotating counterclockwise and for a balanced load are angularly spaced 120° from each other, a measuring unit having translating means, voltage winding means and current winding means effective when energized from a three-phase alternating current system for operating the translating means in accordance with a function of the product of the energizations of the winding means, said current winding means comprising a current winding, a plurality of terminals including first, second and third load terminals, a three-winding current transformer having a secondary winding connected to energize the current winding, said current transformer having two primary windings connected for energization respectively by alternating current $I_1$ flowing between the first terminals and alternating current $I_2$ flowing between the second terminals to energize the current winding in accordance with $I_1-I_2$, a three-winding mutual reactor having a secondary winding connected to energize the current winding through an impedance, said mutual reactor having a pair of primary windings connected for energization respectively by the current $I_2$ and an alternating current $I_3$ passing between the third terminals, the mutual reactor and its secondary circuit having an impedance and energizations proportioned to energize the current winding in accordance with $I_2 \angle 60°$ and $I_3 \angle -120°$, said voltage winding means comprising a voltage winding, and means for applying to the voltage winding an alternating voltage appearing between said terminals which is in phase with the current $I_1$ at unity power factor of the associated alternating current system, said mutual reactor and secondary circuit having a temperature coefficient proportioned to shift current supplied to the current winding in a leading direction in response to increase in temperature of the measuring device, the currents being referred to a vector system such that an angle appended to a vector having a first position operates to rotate the vector counterclockwise for a positive angle and clockwise for a negative angle from such first position for an angular distance represented by said angle.

17. In a measuring device for measuring a function of the product of voltage and current in a three-phase alternating-current system carrying phase currents $I_1$, $I_2$ and $I_3$ which in a vector system are represented by vectors rotating counterclockwise and for a balanced load are angularly spaced 120° from each other, a measuring unit having translating means, voltage winding means and current winding means effective when energized from a three-phase alternating current system for operating the translating means in accordance with a function of the product of the energizations of the winding means, said current winding means comprising a current winding, a plurality of terminals including first, second and third line terminals, first, second and third load terminals, a three-winding current transformer having a secondary winding connected to energize the current winding, said current transformer having two primary windings connected for energization respectively by alternating current $I_1$ flowing between the first terminals and alternating current $I_2$ flowing between the second terminals to energize the current winding in accordance with $I_1-I_2$, a three-winding mutual reactor having a secondary winding connected to energize the current winding through an impedance, said mutual reactor having a pair of primary windings connected for energization respectively by the current $I_2$ and an alternating current $I_3$ passing between the third terminals, the mutual reactor and its secondary circuit having an impedance and energizations proportioned to energize the current winding in accordance with $I_2 \angle 60°$ and $I_3 \angle -120°$, said voltage winding means comprising a voltage winding, and means for applying to the voltage winding an alternating voltage appearing between said terminals which is in phase with the current $I_1$ at unity power factor of the associated alternating current system, said voltage and current windings being constructed of copper, said mutual reactor and secondary circuit having a temperature coefficient substantially lower than that of copper to shift current supplied to the current windings in a leading direction in response to increase in temperature of the measuring device, the currents being referred to a vector system such that an angle appended to a vector having a first position operates to rotate the vector counterclockwise for a positive angle and clockwise for a negative angle from such first position for an angular distance represented by said angle.

References Cited in the file of this patent
UNITED STATES PATENTS

| | | |
|---|---|---|
| 2,555,911 | Anderson | June 5, 1951 |
| 2,646,552 | Shingledecker | July 21, 1953 |
| 2,930,979 | Clarke | Mar. 29, 1960 |
| 2,966,629 | Downing | Dec. 27, 1960 |